United States Patent [19]

Pinato

[11] Patent Number: 4,629,564

[45] Date of Patent: Dec. 16, 1986

[54] CENTRIFUGAL SEPARATOR WITH ANNULAR SEALING MEANS ARRANGED AROUND THE ROTOR OUTLET FOR SEPARATED LIQUID

[75] Inventor: Oskar Pinato, Vedano Al Lambro, Italy

[73] Assignee: Alfa-Laval Separation AB, Tumba, Sweden

[21] Appl. No.: 704,019

[22] Filed: Feb. 21, 1985

[30] Foreign Application Priority Data

Mar. 1, 1984 [SE] Sweden ................................ 8401142

[51] Int. Cl.[4] ............................................ B01D 21/26

[52] U.S. Cl. .................................. 210/512.3; 494/41; 277/25

[58] Field of Search ........................ 494/15, 27, 28, 29, 494/30, 36, 41, 38, 85; 416/174; 415/110, 111, 112, 116, 170 R, DIG. 7; 418/91, 92, 97, 102, 149, DIG. 1; 210/512.1, 512.3; 277/13, 96.1, 81 R, 96.2, 25, 38, 39

[56] References Cited

U.S. PATENT DOCUMENTS

| | | | |
|---|---|---|---|
| 3,409,213 | 1/1967 | Latham, Jr. | 494/41 |
| 3,437,267 | 4/1969 | Dahlberg | 494/41 |
| 3,482,771 | 12/1969 | Thylefors | 494/41 |
| 3,640,452 | 2/1972 | Thylefors | 494/41 |
| 3,642,196 | 2/1972 | Nilsson | 494/41 |
| 4,044,944 | 8/1977 | Moebus et al. | 494/41 |
| 4,081,129 | 3/1978 | Strouaken | 494/41 |
| 4,279,741 | 7/1981 | Campbell | 494/41 |
| 4,300,717 | 11/1981 | Latham, Jr. | 494/41 |
| 4,332,350 | 6/1982 | McClellan | 494/41 |

*Primary Examiner*—Richard V. Fisher
*Assistant Examiner*—Wanda L. Millard
*Attorney, Agent, or Firm*—Cyrus S. Hapgood

[57] ABSTRACT

The invention relates to a centrifugal separator, in which centrifugal treatment is intended to take place at an overpressure, and has for its main object to guarantee wetting and cooling of annular sealing means (16) in connection with the starting of the centrifugal separator, the sealing means being arranged around the rotor outlet for separated liquid between the rotor and a stationary receiving device. The object is obtained according to the invention by having means (22) for supply of a small amount of liquid to an outlet chamber (15) of the rotor already before the separation chamber (6) of the rotor is filled up with liquid, the outlet chamber (15) being connected with the separation chamber (6) via an overflow outlet (14). The means (22) is arranged to supply liquid to the outlet chamber (15) via a connection, which is separated from the separation chamber and is extending through the stationary receiving device. By means of a stationary outlet member (17) provided with a special passage (20) the small amount of liquid supplied to the outlet chamber (15) can be circulated in contact with the annular sealing means (16) during the starting up of the centrifugal separator.

10 Claims, 1 Drawing Figure

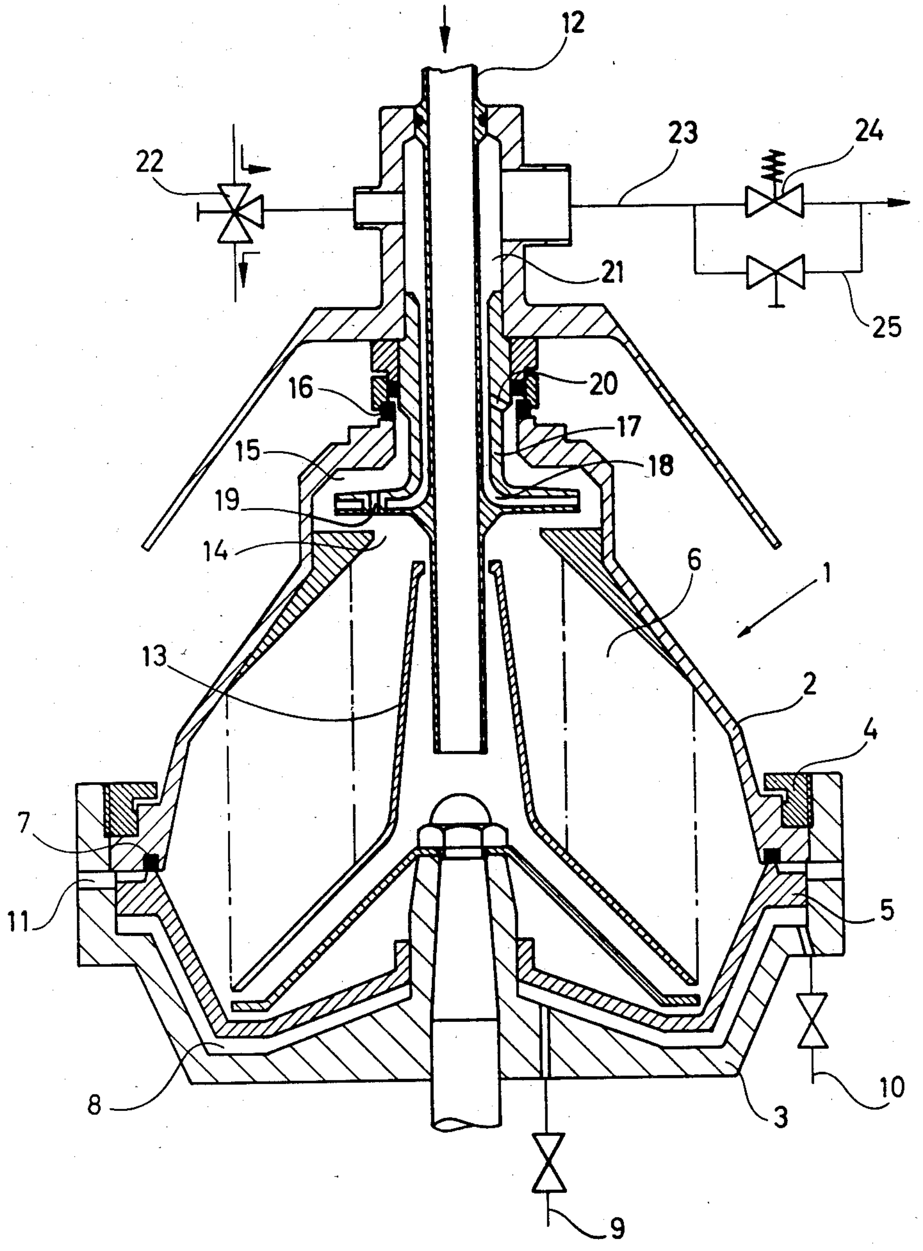
12
22
23
24
21
25
16
20
17
15
18
19
14
6
1
13
2
4
7
11
5
8
3
10
9

CENTRIFUGAL SEPARATOR WITH ANNULAR SEALING MEANS ARRANGED AROUND THE ROTOR OUTLET FOR SEPARATED LIQUID

The present invention relates to a centrifugal separator comprising a rotor having a separation chamber, a central inlet for liquid to be centrifugally treated, a central outlet for a separated liquid and a central outlet chamber, communicating with the separation chamber via an overflow outlet. The centrifugal separator also comprises annular sealing means arranged around said central outlet between the rotor and a stationary device for receiving the liquid having been separated in the rotor, and a stationary outlet member, e.g. a paring member, with at least one outlet channel extending from a level in the outlet chamber radially outside the overflow outlet to the central outlet of the rotor. Further, the outlet member is so designed that at least part of the liquid leaving the outlet chamber via the outlet channel will pass in contact with the sealing means, and a passage being arranged to allow return flow to the outlet chamber of part of said liquid leaving through the outlet channel.

Centrifugal separators with annular sealing means of the above said type are especially used for liquids which have to be treated at an overpressure. For instance, upon clarification of beer or wine containing carbon dioxide the centrifugal treatment has to take place at an overpressure in order to maintain the carbon dioxide dissolved in the beer or wine, and to avoid foaming during the treatment.

In the Swedish Pat. No. 154 514 (DE 10 11 364, US 2 858 063), describing a known centrifugal separator of the type here in question, it is stated that use of a paring member in addition to annular sealing means between the rotor and the stationary receiving device makes it possible to unload pressure from the sealing means. Thus, by this arrangement, the sealing means does not have to be exposed to the often varying backpressure met by the separated liquid in the stationary receiving device.

In operation of a centrifugal separator of the described type the sealing means is heated by friction. Therefore, it has to be wet and cooled in order not to be destroyed by overheating and lose its sealing capability. For this reason the paring member in the centrifugal separator according to the Swedish patent is provided with holes. Through these holes a part of the liquid leaving through the outlet channel is returned to the outlet chamber, the returning liquid passing in wetting and cooling contact with the inside of the sealing means.

One disadvantage with the centrifugal separator according to the Swedish patent is that wetting and cooling of the sealing means by means of the separated liquid can be obtained only after the separation chamber has been filled up with liquid. To guarantee the necessary wetting and cooling of the sealing means essentially from the moment when the rotor starts to rotate it is, therefore, necessary to fill up the entire separation chamber either with liquid to be centrifugally treated or with an auxiliary liquid, such as water, already before the centrifugal rotor is brought into rotation. In practice this means that a part of the product to be centrifugally treated has to be disposed of either because it becomes insufficiently separated or because it is mixed up with some undesired other liquid. Besides, starting of the rotor with a completely filled separation chamber causes heavy loads on the driving equipment for the rotor.

The object of the present invention is to provide a centrifugal separator of the initially described type, in which wetting and cooling of the sealing means around the central outlet of the centrifuge rotor can be guaranteed even upon start of the centrifuge rotor with its separation chamber not filled with a liquid.

This object is achieved according to the invention by providing a centrifugal separator of this type, with means for supplying liquid to the outlet chamber via a connection, which is separated from the separation chamber and extends through the stationary receiving device.

By the invention it is possible to start a centrifuge rotor of this type without previous filling of its separation chamber solely for the reason of wetting and cooling the sealing means here concerned. Instead, a relatively small amount of liquid can be supplied to said outlet chamber, which liquid is prevented by said overflow outlet from flowing further into the separation chamber of the rotor. By means of the stationary device this small amount of liquid can be brought to circulate in a loop in contact with the sealing means until the centrifuge rotor has been brought to its full operational speed.

In the following the invention is described with reference to the accompanying drawing, which shows a section through a centrifugal separator according to the invention.

The centrifugal separator shown in the figure has a rotor 1 comprising an upper rotor part 2 and a lower rotor part 3, which are joined together by a lock ring 4. The upper rotor part 2 and a slide member 5, that is axially movable in the lower rotor part 3, form a separation chamber 6, in which a set of conical separation discs (not shown) is arranged. In a groove in the upper rotor part 2 at the periphery of the separation chamber 6 there is placed a gasket 7, against which the slide member 5 is sealingly abutting. Between the slide member 5 and the lower rotor part 3 there is a chamber 8 for a so called closing liquid, which chamber 8 has an inlet 9 and an outlet 10 provided with valves. Radially outside the gasket 7 there is a number of outlet ports 11 in the lower rotor part 3. A central inlet pipe 12 extends axially into and opens into the interior of the rotor 1. Around this pipe a distributor 13 is arranged.

The rotor 1 also comprises a central outlet, at which there is arranged an overflow outlet 14 via which in operation of the rotor a separated specific lighter liquid flows into a central outlet chamber 15. This outlet chamber 15 is sealed from the ambient air by an annular so called mechanical seal 16, the one sealing ring of which is connected to the upper rotor part 2 and the other sealing ring of which is supported by a stationary device for receiving liquid separated in the rotor. The sealing rings abut axially against each other. In a stationary outlet member in the form of a so called paring member 17 a number of outlet channels 18 extend from the outlet chamber 15 at a level radially outside the overflow outlet 14 to the central outlet of the rotor. The paring member 17 is provided with through flow holes 19. The centrifugal separator also comprises a passage 20, which in this embodiment is formed in the paring member 17. In communication with the central rotor outlet there is a receiving chamber 21, to which are connected a liquid supply device, comprising, among other things a three way valve 22, and an outlet conduit 23 provided with back pressure valve 24 and a by-pass conduit 25 including a valve. The by-pass conduit 25 has substantially smaller flow capacity than the outlet conduit 23.

The shown centrifugal separator operates in the following manner:

At the start of the centrifugal separator the outlet ports 11 are closed by supply of closing liquid through the inlet 9 to the closing chamber 8. By the centrifugal force upon rotation of the centrifuge rotor a pressure is created in the closing liquid which pressure acts on the slide member 5 that is pressed to sealing abutment against the gasket 7.

Already at the beginning of the starting procedure, i.e. as soon as the centrifuge rotor has begun to rotate, and long before it has reached its normal operational speed, liquid is supplied through the valve 22, the receiving chamber 21, the outlet channels 18 and the passage 20 to the outlet chamber 15. This liquid can for instance be constituted by liquid to be centrifugally treated or water. A part of said liquid flows through the passage 20 and is sprayed onto and is cooling the annular seal 16. As a result of the centrifugal force acting on the liquid, that is flowing into the outlet chamber 15, the liquid is prevented from flowing via the overflow outlet 14 to the separation chamber 6. Thereby, the volume of liquid in the outlet chamber 15 increases, and the radius of the free liquid surface therein decreases. When this liquid surface passes the inlets of the outlet channels 18, liquid starts to flow from the outlet chamber 15 through the outlet channels 18, and is recirculated to the outlet chamber 15 through the passage 20 in contact with the seal 16. The pressure in the outlet conduit 23 then will increase with the decreasing radius of the free liquid surface in the outlet chamber 15. This pressure increases until it reaches the pressure of the liquid supplied through the valve 22, which latter pressure is lower than the pressure at which the back pressure valve 24 opens.

When the pressure in the outlet conduit 23 has risen to a predetermined value, a valve (not shown) in the inlet of the centrifuge rotor opens for liquid to be centrifugally treated, and the three way valve 22 is put in a position, in which liquid and/or gas can be discharged from the receiving chamber 21.

The liquid to be centrifugally treated is supplied through the inlet pipe 12 and is distributed into the separation chamber 6 by the distributor 13. In the separation chamber 6 there are stacked a number of conical separation discs (not shown), which are dividing the separation chamber in conical spaces. In these spaces, or disc interspaces, specifically heavier components, such as sludge particles, are separated from the liquid and are thrown out towards the periphery of the separation chamber, where they are collected.

When required, possibly at predetermined time intervals, the valve in the outlet 10 is opened and the valve in the inlet 9 is closed for the closing liquid in the closing chamber 8. Hereby, the closing liquid pressure on the slide member 5 decreases, the slide member 5 by the pressure of the liquid in the separation chamber being moved from abutment against the gasket 7 in the upper rotor part 2 to an opposite end position, so that the ports 11 are uncovered and the separated sludge is thrown out.

The purified specifically lighter liquid phase flows radially inwards in the separation chamber 6 and is conducted via the overflow outlet 14 into the outlet chamber 15. Therefrom the liquid is discharged by the outlet member 17 through the outlet channels 18 to the central outlet and out through the valve 22.

Gases within the separation chamber 6 such as air or carbon dioxide, are discharged through the holes 19 in the paring member 17 and through the passage 20.

When separated liquid begins to flow out of the valve 22 this is closed, and the pressure in the outlet conduit 23 will then increase until the adjustable back pressure valve 24 opens. Upon clarification of wine, which contains carbon dioxide, this occurs when the pressure is about 10 bar. When the back pressure valve has opened, the valve in the by-pass conduit 25 is opened, too. Now the centrifugal separator has been started, and the free liquid surface in the outlet chamber is automatically kept at a certain level radially outside the overflow outlet 14.

By the by-pass conduit 25 gases developed in the separation chamber may be discharged, and at operation disturbances, such as cease of feed to the centrifuge rotor, the existence of the by-pass conduit 25 means that the outlet chamber 15 may be kept filled with liquid. This is because during normal operation an overpressure prevails in the outlet conduit 23 beyond the back pressure valve 24. Owing to this overpressure liquid may flow back to the receiving chamber 21 via the by-pass conduit 25. This eliminates the need of an expensive and complicated supervising equipment to see to that the seal 16 always is kept in contact with liquid.

Through the three way valve 22 there may also be supplied a cleaning liquid to the outlet chamber 15.

Even though the invention is particularly advantageous in connection with centrifugal treatment of liquids at high pressure, the invention alternatively can be used for other applications, and be modified within the scope of the following claims.

I claim:

1. A centrifugal separator comprising a rotor (1) mounted for rotation about an axis and defining a separation chamber (6), a central inlet for liquid to be centrifugally treated and a central outlet for a separated liquid, the rotor also defining a central outlet chamber (15) and an overflow outlet (14) by which the separation chamber (6) communicates with said outlet chamber (15), a stationary device for receiving liquid separated in the rotor, annular sealing means (16) arranged around said central outlet between the rotor (1) and said stationary device, and a stationary outlet member (17) defining at least one outlet channel (18) extending from a level in the outlet chamber (15) radially outside the overflow outlet (14) to said central outlet of the rotor (1), said outlet member (17) being operable to pass liquid leaving the outlet chamber (15) via said outlet chamber (18) substantially in contact with the sealing means (16), there being a return passage (20) for returning to the outlet chamber (15) part of said liquid leaving through the outlet channel (18), and means (22) for supplying liquid to said outlet chamber (15) by way of said stationary receiving device and independently of said separation chamber (6).

2. The separator of claim 1, in which said stationary receiving device defines a receiving chamber (21) communicating with said central outlet of the rotor (1), said liquid supplying means (22) being connected to said receiving chamber (21).

3. The separator of claims 1 or 2, in which liquid supplying means (22) includes a valve.

4. The separator of claims 1 or 2, in which said return passage (20) is formed in said stationary outlet member (17).

5. The separator of claims 1 or 2, in which said sealing means (16) is located in the path of liquid flowing from said return passage (20).

6. The separator of claim 5, in which said return passage (20) is formed in the stationary outlet member (17), said outlet member (17) extending axially past the annular sealing means (16), said return passage (20) being located substantially opposite the sealing means (16) to cause at least part of the liquid returning through said passage (20) to be sprayed onto the sealing means (16).

7. The separator of claims 1 or 2, in which said stationary receiving device includes an outlet conduit (23) communicating with the central outlet of the rotor, the separator comprising also a back pressure valve (24) located in said outlet conduit (23) and operable to open in response to the pressure exceeding a predetermined value in said conduit (23) between the rotor (1) and the back pressure valve (24), and a by-pass conduit (25) having a substantially smaller capacity than the outlet conduit (23) and positioned to conduct fluid past the back pressure valve (24).

8. The separator of claim 7, comprising also a valve in said by-pass conduit (25).

9. The separator of claims 1 or 2, in which said sealing means (16) is a mechanical seal having two annular parts, one of said parts being connected with the rotor while the other part is supported by said stationary receiving device, said parts sealingly abutting axially against each other.

10. The separator of claims 1 or 2, in which said stationary outlet member (17) is a paring member.

* * * * *